United States Patent Office 3,033,871
Patented May 8, 1962

3,033,871

18-AMINO PROGESTERONES AND THEIR MANUFACTURE

Oskar Jeger, Zurich, Switzerland, assignor to Ciba Pharmaceutical Products Inc., Summit, N.J.

No Drawing. Filed June 17, 1960, Ser. No. 36,741
Claims priority, application Switzerland June 17, 1959
8 Claims. (Cl. 260—397.3)

This invention is based on the observation that 18-amino-progesterones and N-acyl-derivatives thereof can be made in a simple manner by reacting a $\Delta^{4:20(N)}$-18:20-imino-3-keto-pregnadiene with an organic acid halide in the presence of an alkali, and, if desired, hydrolyzing the resulting N-acyl-derivative to form the 18-amino-progesterone derivative and converting the latter into a salt thereof.

The process may be represented as follows:

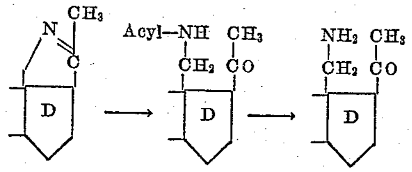

The 18-amino-progesterones or corresponding N-acyl derivatives obtained as end products are important intermediates for the preparation of the corresponding 18-hydroxy-progesterones, which are known to be either physiologically active compounds or intermediates for the preparation of various other 18-oxygenated steroids, especially of the pregnane series. The conversion of the products of the invention into the said 18-hydroxy-progesterones may be illustrated in the following specific case in which an N-acyl-18-amino progesterone is transformed into the progestatively active 18-hydroxy-progesterone already known:

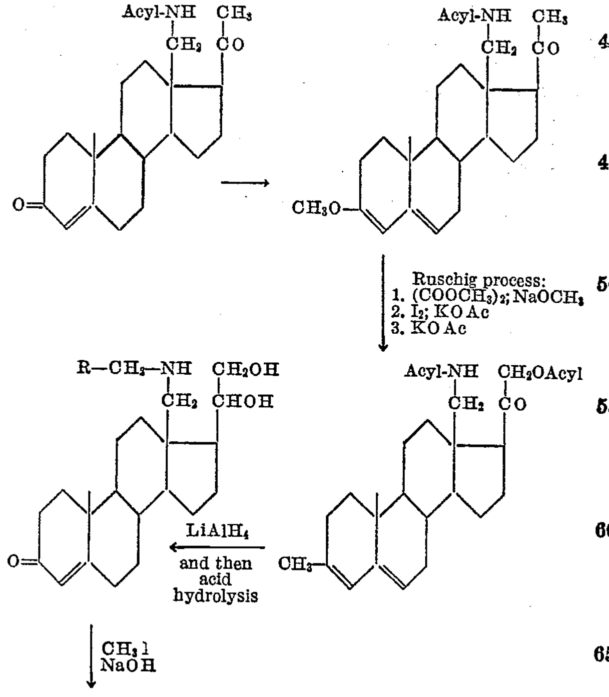

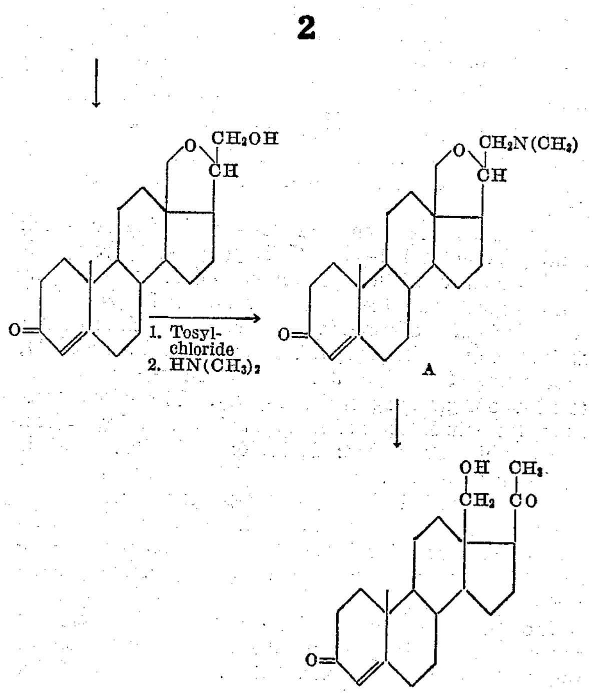

In carrying out the process of the invention the starting material is reacted with an organic carboxylic or sulfonic acid halide, for example, acetyl, propionyl, butyryl or benzoyl chloride or bromide, p-toluene sulfonyl chloride, benzenesulfonyl chloride, methane sulfonyl chloride, in the presence of an aqueous alkali, for example, sodium hydroxide or potassium hydroxide. As solvent there is used a base, such as pyridine, which is miscible with water. The reaction is usually carried out at room temperature and there is obtained as reaction product the 18-acylamino-20-ketone corresponding to the starting material. The product can be converted by acid or alkaline hydrolysis into an 18-amino-progesterone and the latter may be converted into a salt thereof, for example, the hydrochloride, hydrobromide, sulfate, methane sulfonate, picrate etc.

As starting materials $\Delta^{4:20:N}$-18:20-imino-3-keto-pregnadienes unsubstituted in 21-position and their 3-keto-derivatives are used. They may contain substituents such as free or functionally converted hydroxyl or oxo groups, halogen atoms, alkyl, such as methyl groups, for example also in positions 1, 2, 4, 5, 6, 7, 8, 9, 11, 12, 14, 15, 16 and 17. By functionally converted hydroxyl or oxo groups there may be understood esterified or etherified hydroxyl groups or ketalized or enolized oxo groups or oximes, hydrazones or semicarbazones. The starting materials may also contain further double bonds, for example in positions 9, 11 or 14.

The following examples illustrate the invention:

*Example 1*

39 milligrams of $\Delta^{4:20(N)}$-18:20-imino-3-keto-pregnadiene melting at 187° C. are dissolved in a mixture of 2 cc. of pyridine, 0.5 cc. of water and 400 milligrams of potassium hydroxide, and to the solution there is added at room temperature dropwise, while stirring, 0.4 cc. of benzoyl chloride dissolved in 2 cc. of pyridine and 0.5 cc. of water. After 18 hours the mixture is taken up in ether and the ethereal solution is exhaustively washed with water, tartaric acid solution of 10% strength, and again with water. There are obtained 95 milligrams of a colourless neutral oil and 17 milligrams of basic products which melt at 175–178° C. and are identifiable as unchanged starting material.

For the purpose of purification the neutral constituents are dissolved in 20 cc. of a mixture of benzene and petroleum ether (1:1) and the solution is filtered through a column of 6 grams of aluminum oxide (activity II). By means of the same solvent mixture a total of 58 milligrams of crystals melting at 185–186° C. can be eluted from the column, which corresponds to a yield of crude material amounting to 58% of the theoretical yield calculated on the starting material that undergoes reaction.

For the purpose of analysis a product having a constant melting point of 191–192° C. is prepared by recrystallization from a mixture of acetone and petroleum ether. The product has the specific rotation $[\alpha]_D=+245°$ ($c$=1.45 in chloroform), infra-red bands (in chloroform) at 3400 cm.$^{-1}$ (NH-group), 1695 cm.$^{-1}$ (C-20 carbonyl), 1668 cm.$^{-1}$ (CONH) and 1659/1619 cm.$^{-1}$ ($\alpha$:$\beta$-unsaturated ketone-grouping of the ring A). Ultra-violet spectrum (in ethanol): maximum at 239 m$\mu$, log$\epsilon$=4.24. $C_{28}H_{35}O_3N$. Calculated: C, 77.56; H, 8.14%. Found: C, 77.38; H, 8.00%.

The product is 18-benzoylamino-progesterone.

By carrying out the reaction with another acid halide, for example, acetyl chloride, the corresponding 18-acylamino-progesterone, for example, 18-acetyl-amino-progesterone, is obtained.

The 18-acylamino-progesterones so obtained can be converted by hydrolysis into the 18-amino-progesterone and the latter may be converted into a salt thereof, for example, its hydrochloride.

*Example 2*

400 milligrams of $\Delta^{4;20,N}$-18,20-imino-3-keto-pregnadiene (I), dissolved in 6 ml. of pyridine, are admixed with 400 mg. of potassium hydroxide in 6 ml. of water, and 470 mg. of para-toluenesulfonic acid introduced in portions in the course of 20 minutes into the resulting mixture. The mixture is mechanically shaken overnight at 20° C., then acidified with 20% hydrochloric acid (until an acid reaction to Congo red is obtained) and the neutral portion taken up in benzene. There are thus obtained 230 mg. of a basic portion which according to melting point and mixed melting point is identified as starting material, and 250 mg. of neutral products (~100% yield, calculated on reacted material). On repeated recrystallization of these neutral constituents from methanol or benzene there are obtained 150 mg. of crystals of melting point 142–143° C. In the UV spectrum they exhibit a maximum at 233 m$\mu$ (log$\epsilon$=4.26) (in ethanol) and in the IR spectrum bands at 3280, 3000, 1705, 1670 and 1620 cm.$^{-1}$ (in chloroform). The product is the 18-para-tosylamino-progesterone (II).

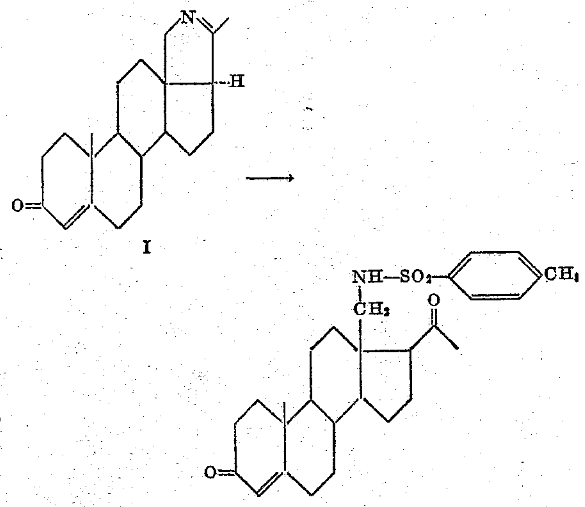

I

II

What is claimed is:

1. Process for the manufacture of 18-acyl-amino-pregnenes, wherein a member selected from the group consisting of a $\Delta^{4;20,N}$-18:20-imino-3-keto-pregnadiene unsubstituted in the 21-position and a 3-keto-derivative thereof selected from the group consisting of ketals, enols, oximes, hydrazones and semicarbazones is reacted with an organic acid halide in the presence of an alkali.

2. Process as claimed in claim 1, wherein the reaction is carried out with benzoyl chloride in the presence of a member selected from the group consisting of sodium and potassium hydroxide in an aqueous medium.

3. Process as claimed in claim 1, wherein the 18-acyl-amino-pregnene compound obtained is hydrolyzed to form the free 18-amino-pregnene compound.

4. Process as claimed in claim 3, wherein the free 18-amino compound is salified with an acid.

5. A compound selected from the group consisting of an 18-amino-progesterone, its acid addition salts, corresponding 3-keto derivatives selected from the group consisting of ketals, enols, oximes, hydrazones and semicarbazones and N-acyl derivatives, the acyl group being derived from acids selected from the group consisting of a lower aliphatic carboxylyic acid and lower aliphatic sulfonic acid, a monocyclic aromatic carboxylic acid and a monocyclic aromatic sulfonic acid.

6. 18-amino-progesterone.

7. 18-benzoylamino-progesterone.

8. 18-para-tosylamino-progesterone.

No references cited.

UNITED STATES PATENT OFFICE

CERTIFICATE OF CORRECTION

Patent No. 3,033,871 May 8, 1962

Oskar Jeger

It is hereby certified that error appears in the above numbered patent requiring correction and that the said Letters Patent should read as corrected below.

Column 2, formula A, upper right-hand portion, for "$CH_2N(CH_3)$" read -- $CH_2N(CH_3)_2$ --; same column 2, line 59, for "39" read -- 93 --; column 3, line 41, after "acid" insert -- chloride --; column 4, line 28, for "$\Delta^{4:20:N}$" read -- $\Delta^{4;20:N}$ --.

Signed and sealed this 11th day of September 1962.

(SEAL)
Attest:

ERNEST W. SWIDER
Attesting Officer

DAVID L. LADD
Commissioner of Patents